(12) United States Patent
Yu et al.

(10) Patent No.: US 12,450,432 B2
(45) Date of Patent: Oct. 21, 2025

(54) METHOD OF ENTITY RECOGNITION FOR DATA TABLE, ELECTRONIC DEVICE AND STORAGE MEDIUM

(71) Applicant: Beijing Volcano Engine Technology Co., Ltd., Beijing (CN)

(72) Inventors: Yonghong Yu, Beijing (CN); Zhiyong Liu, Beijing (CN); Chao Xu, Beijing (CN); Yang Gao, Beijing (CN); Xiaoming Zhao, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/988,785

(22) Filed: Dec. 19, 2024

(65) Prior Publication Data

US 2025/0225322 A1 Jul. 10, 2025

(30) Foreign Application Priority Data

Jan. 8, 2024 (CN) .......................... 202410030477.8

(51) Int. Cl.
*G06F 40/30* (2020.01)
*G06F 16/334* (2025.01)
*G06F 40/174* (2020.01)
*G06F 40/186* (2020.01)
*G06F 40/279* (2020.01)

(52) U.S. Cl.
CPC ........ *G06F 40/279* (2020.01); *G06F 16/3344* (2019.01); *G06F 40/174* (2020.01); *G06F 40/186* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 10,565,498 B1 * | 2/2020 | Zhiyanov | G06N 3/045 |
| 11,500,865 B1 * | 11/2022 | Wang | G06N 3/045 |
| 11,604,794 B1 * | 3/2023 | Nallapati | G06F 16/24522 |
| 11,726,750 B1 * | 8/2023 | Arcadinho | G06F 8/33 |
| | | | 717/113 |

(Continued)

FOREIGN PATENT DOCUMENTS

| | | |
|---|---|---|
| CN | 111222337 A | 6/2020 |
| CN | 117217221 A | 12/2023 |

*Primary Examiner* — Lamont M Spooner
(74) *Attorney, Agent, or Firm* — Astute IP Law Group

(57) ABSTRACT

A method of entity recognition for a data table, an electronic device and storage medium are provided. The method includes: obtaining a to-be-processed query statement described in a natural language; encoding the to-be-processed query statement according to entity information of a to-be-query data table for each to-be-query data table in at least one to-be-query data table, to acquire at least one encoded result; respectively inputting the at least one encoded result into an entity recognition model, to acquire at least one entity prediction result; and determining a target entity prediction result corresponding to the to-be-processed query statement according to the at least one entity prediction result, wherein the target entity prediction result indicates the entity included in the to-be-processed query statement.

18 Claims, 4 Drawing Sheets

(56) References Cited

U.S. PATENT DOCUMENTS

| | | | |
|---|---|---|---|
| 11,726,994 B1* | 8/2023 | Wang | G06F 16/24573 |
| | | | 707/769 |
| 2019/0147083 A1* | 5/2019 | Milligan | G06F 16/3344 |
| | | | 707/767 |
| 2019/0251191 A1* | 8/2019 | Bedadala | G06V 40/168 |
| 2020/0151206 A1* | 5/2020 | Balakavi | G06F 16/3344 |
| 2021/0319054 A1* | 10/2021 | Glass | G06N 3/08 |
| 2022/0129450 A1* | 4/2022 | Cao | G06F 16/2433 |
| 2022/0198581 A1* | 6/2022 | Rusu | G06F 40/284 |
| 2022/0237480 A1* | 7/2022 | Zhang | G06N 3/045 |
| 2023/0122121 A1* | 4/2023 | O'Donoghue | G06F 18/22 |
| | | | 706/12 |
| 2023/0154146 A1* | 5/2023 | Li | G06V 20/46 |
| | | | 382/159 |
| 2023/0169075 A1* | 6/2023 | Han | G06F 16/243 |
| | | | 707/769 |
| 2024/0273294 A1* | 8/2024 | Shakeri | G06F 40/295 |

* cited by examiner

METHOD OF ENTITY RECOGNITION FOR DATA TABLE, ELECTRONIC DEVICE AND STORAGE MEDIUM

CROSS-REFERENCE TO RELATED APPLICATION

The present disclosure claims priority of the Chinese Patent Application No. 202410030477.8 filed on Jan. 8, 2024, the disclosure of which is incorporated herein by reference in its entirety as part of the present application.

TECHNICAL FIELD

The present disclosure relates to a method of entity recognition for a data table, an electronic device and a storage medium.

BACKGROUND

In some scenarios, it is necessary to query data in a data table. Currently, a user may write a query statement in a specific programming language to query data in the data table. However, in this manner, the user needs to have a certain programming basis. In order to improve convenience of querying data in the data table, in some scenarios, the user may input a query statement described in a natural language to query data in the data table.

In a scenario of querying data in the data table based on the foregoing query statement, it is particularly important to recognize an entity included in the query statement and existing in the data table. This is because after the entity is recognized, corresponding data may be queried from the data table with the entity as an index.

SUMMARY

In order to solve the foregoing technical problems or at least partially solve the foregoing technical problems, embodiments of the present disclosure provide a method and apparatus of entity recognition for a data table.

An embodiment of the present disclosure provides a method of entity recognition for a data table, including:
   obtaining a to-be-processed query statement described in a natural language;
   encoding the to-be-processed query statement according to entity information of a to-be-query data table for each to-be-query data table in at least one to-be-query data table, to acquire at least one encoded result, wherein the at least one encoded result includes an encoded result respectively corresponding to each to-be-query data table;
   respectively inputting the at least one encoded result into an entity recognition model, to acquire at least one entity prediction result, wherein the at least one entity prediction result includes an entity prediction result respectively corresponding to each encoded result in the at least one encoded result, and the entity recognition model is configured to predict an entity included in input information according to the input information; and
   determining a target entity prediction result corresponding to the to-be-processed query statement according to the at least one entity prediction result, wherein the target entity prediction result indicates the entity included in the to-be-processed query statement.

Optionally, the encoding the to-be-processed query statement according to the entity information of the to-be-query data table includes:
   encoding a first word segmentation that is completely matched with an entity in the to-be-query data table in the to-be-processed query statement by using a first encoding manner; and/or
   encoding a second word segmentation that is partially matched with the entity in the to-be-query data table in the to-be-processed query statement by using a second encoding manner, wherein the second encoding manner is different from the first encoding manner.

Optionally, encoding the first word segmentation by using the first encoding manner includes:
   encoding the first word segmentation by using a preset encoding manner, to acquire a word embedding corresponding to the first word segmentation; and acquiring an encoded result corresponding to the first word segmentation according to the word embedding corresponding to the first word segmentation and first indication information, wherein the first indication information indicates the first word segmentation being a word segmentation that is completely matched with the entity in the to-be-query data table, and the encoded result corresponding to the first word segmentation includes the word embedding corresponding to the first word segmentation and the first indication information;
   encoding the second word segmentation by using the second encoding manner includes:
   encoding the second word segmentation by using the preset encoding manner, to acquire a word embedding corresponding to the second word segmentation; and acquiring an encoded result corresponding to the second word segmentation according to the word embedding corresponding to the second word segmentation and second indication information, wherein the second indication information indicates the second word segmentation being a word segmentation that is partially matched with the entity in the to-be-query data table, and the encoded result corresponding to the second word segmentation includes the word embedding corresponding to the second word segmentation and the second indication information.

Optionally, the first encoding manner is related to an entity type of an entity that is completely matched with the first word segmentation in the to-be-query data table, and the first encoding manner corresponding to different word segmentations that are completely matched with entities of different types in the to-be-query data table is different; and
   the second encoding manner is related to an entity type of an entity that is partially matched with the second word segmentation in the to-be-query data table, and the second encoding manner corresponding to different word segmentations that are partially matched with entities of different types in the to-be-query data table is different.

Optionally, the method further includes:
   matching the to-be-processed query statement with a plurality of candidate data tables; and
   determining the at least one to-be-query data table from candidate data tables that are successfully matched with the to-be-processed query statement.

Optionally, the determining the target entity prediction result corresponding to the to-be-processed query statement according to the at least one entity prediction result includes:
   determining, for each entity prediction result in the at least one entity prediction result, an entity matching degree between the entity prediction result and an entity in a to-be-query data table corresponding to the entity prediction result, wherein the to-be-query data table corresponding to the entity prediction result is a to-be-query data table corresponding to an encoded result used by the entity recognition model to predict the entity prediction result; and determining, from the at least one entity prediction result, an entity prediction result corresponding to a highest entity matching degree as the target entity prediction result.

Optionally, the entity recognition model is obtained through training in the following manner:

obtaining a query statement template described in a natural language, wherein the query statement template includes an entity placeholder;

filling the query statement template with an entity in a training data table, to acquires a training query statement; and training the entity recognition model by using the training query statement and a label corresponding to the training query statement, wherein the label corresponding to the training query statement is used for indicating the entity included in the training query statement.

Optionally, the filling the query statement template with the entity in the training data table includes:

filling the query statement template with an entity that is completely matched with the entity in the training data table; and/or filling the query statement template with an entity that is partially matched with the entity in the training data table.

Optionally, the training the entity recognition model by using the training query statement and the label corresponding to the training query statement includes:

encoding the training query statement, to acquire an encoded result; and training the entity recognition model based on the label and the encoded result acquired by encoding the training query statement, wherein:

a first entity that is completely matched with an entity in the training data table in the training query statement is encoded by using a first encoding manner; and/or a second entity that is partially matched with the entity in the training data table in the training query statement is encoded by using a second encoding manner.

Optionally, the first encoding manner is related to an entity type of an entity that is completely matched with the first entity in the training data table, and the first encoding manner corresponding to different entities that are completely matched with entities of different types in the training data table is different; and the second encoding manner is related to an entity type of an entity that is partially matched with the second entity in the training data table, and the second encoding manner corresponding to different entities that are partially matched with entities of different types in the training data table is different.

An embodiment of the present disclosure provides an apparatus of entity recognition for a data table, wherein the apparatus includes:

an obtaining unit, configured to obtain a to-be-processed query statement described in a natural language;

an encoding unit, configured to encode the to-be-processed query statement according to entity information of a to-be-query data table for each to-be-query data table in at least one to-be-query data table, to acquire at least one encoded result, wherein the at least one encoded result includes an encoded result respectively corresponding to each to-be-query data table;

a first determining unit, configured to respectively input the at least one encoded result into an entity recognition model, to acquire at least one entity prediction result, wherein the at least one entity prediction result includes an entity prediction result respectively corresponding to each encoded result in the at least one encoded result, and the entity recognition model is configured to predict an entity included in input information according to the input information; and a second determining unit, configured to determine a target entity prediction result corresponding to the to-be-processed query statement according to the at least one entity prediction result, wherein the target entity prediction result indicates the entity included in the to-be-processed query statement.

Optionally, the encoding unit is configured to:

encode a first word segmentation that is completely matched with an entity in the to-be-query data table in the to-be-processed query statement by using a first encoding manner; and/or encode a second word segmentation that is partially matched with the entity in the to-be-query data table in the to-be-processed query statement by using a second encoding manner, wherein the second encoding manner is different from the first encoding manner.

Optionally, encoding the first word segmentation by using the first encoding manner includes:

encoding the first word segmentation by using a preset encoding manner, to acquire a word embedding corresponding to the first word segmentation; and acquiring an encoded result corresponding to the first word segmentation according to the word embedding corresponding to the first word segmentation and first indication information, wherein the first indication information indicates the first word segmentation being a word segmentation that is completely matched with the entity in the to-be-query data table, and the encoded result corresponding to the first word segmentation includes the word embedding corresponding to the first word segmentation and the first indication information;

encoding the second word segmentation by using the second encoding manner includes:

encoding the second word segmentation by using the preset encoding manner, to acquire a word embedding corresponding to the second word segmentation; and acquiring an encoded result corresponding to the second word segmentation according to the word embedding corresponding to the second word segmentation and second indication information, wherein the second indication information indicates the second word segmentation being a word segmentation that is partially matched with the entity in the to-be-query data table, and the encoded result corresponding to the second word segmentation includes the word embedding corresponding to the second word segmentation and the second indication information.

Optionally, the first encoding manner is related to an entity type of an entity that is completely matched with the first word segmentation in the to-be-query data table, and the first encoding manner corresponding to different word segmentations that are completely matched with entities of different types in the to-be-query data table is different; and the second encoding manner is related to an entity type of an entity that is partially matched with the second word segmentation in the to-be-query data table, and the second encoding manner corresponding to different word segmentations that are partially matched with entities of different types in the to-be-query data table is different.

Optionally, the apparatus further includes:

a matching unit, configured to match the to-be-processed query statement with a plurality of candidate data tables; and a third determining unit, configured to determine the at least one to-be-query data table from candidate data tables that are successfully matched with the to-be-processed query statement.

Optionally, the second determining unit is configured to:

determine, for each entity prediction result in the at least one entity prediction result, an entity matching degree between the entity prediction result and an entity in a to-be-query data table corresponding to the entity prediction result, wherein the to-be-query data table corresponding to the entity prediction result is a to-be-query data table corresponding to an encoded result used by the entity recognition model to predict the entity prediction result; and determine, from the at least one entity prediction result, an entity prediction result corresponding to a highest entity matching degree as the target entity prediction result.

Optionally, the entity recognition model is acquired through training in the following manner:

obtaining a query statement template described in a natural language, wherein the query statement template includes an entity placeholder;

filling the query statement template with an entity in a training data table, to acquire a training query statement; and training the entity recognition model by using the training query statement and a label corresponding to the training query statement, wherein the label corresponding to the training query statement is used for indicating the entity included in the training query statement.

Optionally, the filling the query statement template with the entity in the training data table includes:

filling the query statement template with an entity that is completely matched with the entity in the training data table; and/or filling the query statement template with an entity that is partially matched with the entity in the training data table.

Optionally, the training the entity recognition model by using the training query statement and the label corresponding to the training query statement includes:

encoding the training query statement, to acquire an encoded result; and training the entity recognition model based on the label and the encoded result acquired by encoding the training query statement, wherein:

a first entity that is completely matched with an entity in the training data table in the training query statement is encoded by using a first encoding manner; and/or a second entity that is partially matched with the entity in the training data table in the training query statement is encoded by using a second encoding manner.

Optionally, the first encoding manner is related to an entity type of an entity that is completely matched with the first entity in the training data table, and the first encoding manner corresponding to different entities that are completely matched with entities of different types in the training data table is different; and the second encoding manner is related to an entity type of an entity that is partially matched with the second entity in the training data table, and the second encoding manner corresponding to different entities that are partially matched with entities of different types in the training data table is different.

According to a third aspect, an embodiment of the present disclosure provides an electronic device, including a processor and a memory;

the processor is configured to execute instructions stored in the memory, so that the device executes the method of the above and the possible implementations of the above.

An embodiment of the present disclosure provides a non-transient computer-readable storage medium, including instructions, and the instructions instruct a device to execute the method of the above and the possible implementations of the above.

An embodiment of the present disclosure provides a computer program product which, when running on a computer, causes the computer to execute the method of the above and the possible implementations of the above.

BRIEF DESCRIPTION OF DRAWINGS

In order to more clearly describe the embodiments of the present disclosure, the following briefly describes the accompanying drawings used in describing the embodiments. It is clear that the accompanying drawings in the following description merely show some embodiments of the present disclosure, and a person of ordinary skill in the art may still derive other drawings from these accompanying drawings without creative efforts.

DETAILED DESCRIPTION

Figure 1:
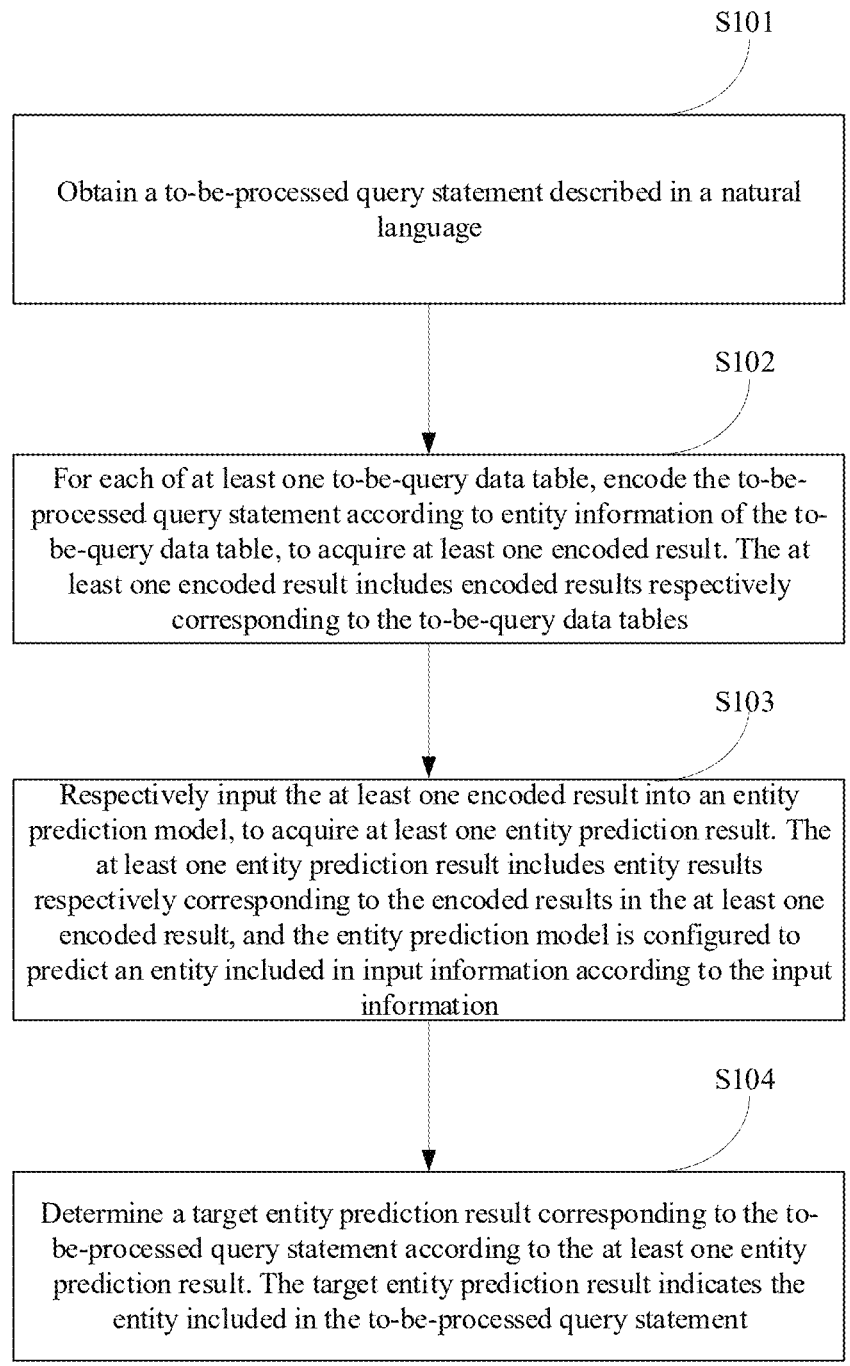
FIG. 1 is a schematic flowchart of a method of entity recognition for a data table according to an embodiment of the present disclosure.

In order to enable persons skilled in the art to better understand the solutions of the present disclosure, the technical solutions in the embodiments of the present disclosure will be described below clearly and completely with reference to the accompanying drawings in the embodiments of the present disclosure. Obviously, the described embodiments are merely some rather than all of the embodiments of the present disclosure. All other embodiments obtained by persons of ordinary skill in the art based on the embodiments of the present disclosure without creative efforts shall fall within the protection scope of the present disclosure.

The inventors of the present disclosure have found through research that in some scenarios, a large language model or a deep learning model may be used to recognize an entity included in a statement and existing in a data table. For example, the statement is input into the large language model or the deep learning model, and the large language model or the deep learning model processes the statement, to predict an entity included in the statement. However, in this manner, a result predicted by the large language model or the deep learning model often depends on a training sample used in a model training process. When coverage of the training sample is not sufficient, a prediction result output by the large language model or the deep learning model may be inaccurate.

The entity of the data table needs to be described. The entity may include a table name, a dimension, an indicator, a dimension member value of the data table, and the like in the data table. The dimension refers to an attribute of data in the data table. For example, in the data table described in Table 1 below, "city name" and "region name" belong to dimensions.

The dimension member value refers to a specific value stored in each dimension in the data table. For example, in the data table described in Table 1 below, "city A", "region B" or the like belong to dimension member values. Table 1 shows entities included in a data table and specific values corresponding to the entities.

An indicator refers to a specific quantized value defined by a service in the data table. For example, in the data table described in Table 1 below, "sales", "profit margin" or the like belong to indicators.

As there are many types and a large quantity of data tables in a service, there are a large number of similar entities or entities with an inclusion relationship between different data tables. A same query statement needs to recognize a corresponding entity for different data tables. For example, the data table described in Table 1 and the data table described in Table 2 is illustrated as an example, for the query statement "View sales data of city A in the last seven days", for the data table described in Table 1, entities that need to be recognized are "city A" and "sales", and for the data table described in Table 2, entities that need to be recognized are "city A" and "sales in the last seven days". Table 2 shows entities included in a data table and specific values corresponding to the entities.

TABLE 1

| Dimension | City | Region | Product name | Date |
|---|---|---|---|---|
| Dimension member value | A | Region B | Computers, printers | *** |
| Indicator | Sales | Profit margin | Transaction volume | |
| Indicator value | *** | *** | *** | |

TABLE 2

| Dimension | City | Region | Product name | Date |
|---|---|---|---|---|
| Dimension member value | A | Region B | Computers, printers | *** |
| Indicator | Sales in the last seven days | Profit margin in the last three days | Transaction volume in the last one day | |
| Indicator value | *** | *** | *** | |

Current solutions for performing entity recognition by using the large language model or the deep learning model cannot meet the foregoing requirement of "recognizing a corresponding entity for different data tables according to a same query statement". How to accurately recognize the entity is a problem to be solved at present.

In order to solve the foregoing problem, an embodiment of the present disclosure provides a method and an apparatus of entity recognition for a data table.

Various non-limiting implementations of the present disclosure are described in detail below with reference to the accompanying drawings.

Referring to FIG. 1, FIG. 1 is a schematic flowchart of a method of entity recognition for a data table according to an embodiment of the present disclosure. The method provided in this embodiment of the present disclosure may be applied to a terminal device or a server. This is not specifically limited in the embodiments of the present disclosure.

In an example, the solution in this embodiment of the present disclosure may be applied to a data query scenario, for example, to query data in a data table in a target service system. In this scenario, a user may input a query statement in a natural language. A server (or a terminal device) may first execute the solution provided in this embodiment of the present disclosure to recognize an entity in the query statement, and then query the data table in the service system by using the entity as an index, to obtain data corresponding to the query statement.

In this embodiment, the method may include, for example, the following steps S101 to S104.

S101: Obtain a to-be-processed query statement described in a natural language.

In an example, the to-be-processed query statement may be the query statement input by the user mentioned above. As an example, the user may input the to-be-processed query statement in a query statement input area. One or more entities may be included in the to-be-processed query statement. The to-be-processed query statement is not specifically limited in the embodiments of the present disclosure. In an example, the to-be-processed query statement may be a query statement that conforms to a format of a query statement template mentioned below.

S102: Encode the to-be-processed query statement according to entity information of a to-be-query data table for each to-be-query data table in at least one to-be-query data table, to obtain at least one encoded result. The at least one encoded result includes an encoded result respectively corresponding to each to-be-query data table.

In this embodiment of the present disclosure, the to-be-query data table mentioned here may be a data table included in the foregoing target service system.

In an example, the at least one to-be-query data table may include all data tables in the target service system.

In another example, in consideration of a large quantity of data tables included in the target service system, some data tables may have little correlation with the to-be-processed query statement. For these data tables that have little correlation, determining an entity corresponding to the to-be-processed query statement and the data table is meaningless. Therefore, in an example, in order to reduce a calculation amount of determining the entity in the to-be-processed query statement and improve efficiency of determining the entity in the to-be-processed query statement, the at least one to-be-query data table may be a data table that has a specific correlation with the to-be-processed query statement. In this case, the at least one to-be-query data table may be determined through the following steps A1 and A2.

A1: Match the to-be-processed query statement with a plurality of candidate data tables.

In an example, data tables in the foregoing target service system may be used as the candidate data tables. It is not difficult to understand that there may be a plurality of candidate data tables. Further, the to-be-processed query statement is matched with the plurality of candidate data tables. For example, the to-be-processed query statement is segmented, and a word segmentation acquire through segmentation is matched with an entity in a candidate data table.

A2: Determine the at least one to-be-query data table from candidate data tables that are successfully matched with the to-be-processed query statement.

In an example, if the to-be-processed query statement includes one or more word segmentations, and the one or more word segmentations are successfully matched (for example, completely matched or partially matched) with an entity in a candidate data table, it may be determined that the to-be-processed query statement is successfully matched with the candidate data table. It is not difficult to understand that the to-be-processed query statement is successfully matched with the candidate data table, indicating the to-be-processed query statement having a specific correlation with the candidate data table. Therefore, the at least one to-be-query data table may be determined from the candidate data tables that are successfully matched with the to-be-processed query statement. In an example, the candidate data tables that are successfully matched with the to-be-processed query statement may be determined as the at least one to-be-query data table. In an example, candidate data tables with a corresponding matching degree higher than a specific threshold may be selected as the at least one to-be-query data table based on the matching degree between the to-be-processed query statement and the candidate data tables. In an example, the matching degree between the to-be-processed query statement and the candidate data tables may be sorted in descending order of the matching degree, and at least one candidate data table corresponding to a preceding matching degree may be used as the at least one to-be-query data table.

In an example, the matching degree between the to-be-processed query statement and the candidate data table may be determined, for example, based on a quantity of word segmentations included in the to-be-processed query statement which are successfully matched with an entity in the candidate data table. A larger quantity of word segmentations that are successfully matched with the entity in the candidate data table indicates a higher matching degree.

In this embodiment of the present disclosure, for the at least one to-be-query data table, an entity included in the to-be-processed query statement and corresponding to each to-be-query data table may be respectively determined. For any to-be-query data table, when implementing determining an entity included in the to-be-processed query statement and corresponding to the to-be-query data table, the to-be-processed query statement may be encoded according to the entity information of the to-be-query data table, to acquire a corresponding encoded result. Then, the entity included in the to-be-processed query statement and corresponding to the to-be-query data table is determined based on the encoded result.

In this embodiment of the present disclosure, the entity information of the to-be-query data table may include one or more entities included in the to-be-query data table. There are a plurality of implementation manners for encoding the to-be-processed query statement according to the entity information of the to-be-query data table. The following describes two possible implementation manners.

In an implementation manner, an entity in the to-be-query data table and the to-be-processed query statement may be spliced, and content obtained through splicing is encoded. For example, the content obtained through splicing is encoded by using an encoding manner.

In another implementation manner, a first word segmentation that is completely matched with an entity in the to-be-query data table in the to-be-processed query statement is encoded by using a first encoding manner, and a second word segmentation that is partially matched with the entity in the to-be-query data table in the to-be-processed query statement is encoded by using a second encoding manner. The first encoding manner is different from the second encoding manner. In this case, the entity information in the to-be-query data table may be carried in the encoded result by using the encoding manner. The complete matching and the partial matching need to be described. For any two word segmentations, if the two word segmentations are the same, it indicates that the two word segmentations are completely matched. If the two word segmentations are not completely the same but include a common part, the two word segmentations are partially matched. In addition, a third word segmentation that is completely not matched with the entity in the to-be-query data table in the to-be-processed query statement is encoded by using a third encoding manner.

In an example, when the first word segmentation is encoded by using the first encoding manner in a specific implementation, for example, the first word segmentation may be encoded by using a preset encoding manner, to acquire a word embedding corresponding to the first word segmentation, and then an encoded result (namely, an encoded result corresponding to the first word segmentation) acquired by encoding the first word segmentation is acquired according to the word embedding corresponding to the first word segmentation and first indication information. The first indication information indicates the first word segmentation being a word segmentation that is completely matched with the entity in the to-be-query data table. The first indication information is not specifically limited in the embodiments of the present disclosure, and for example, may be a character "E". The encoded result corresponding to the first word segmentation includes the word embedding corresponding to the first word segmentation and the first indication information. In an example, the word embedding corresponding to the first word segmentation and the first indication information may be spliced to acquire the encoded result corresponding to the first word segmentation.

Similarly, when the second word segmentation is encoded by using the second encoding manner in a specific implementation, for example, the second word segmentation may be encoded by using the preset encoding manner, to acquire a word embedding corresponding to the second word segmentation, and then an encoded result (namely, an encoded result corresponding to the second word segmentation) acquired by encoding the second word segmentation is acquired according to the word embedding corresponding to the second word segmentation and second indication information. The second indication information indicates the second word segmentation being a word segmentation that is partially matched with the entity in the to-be-query data table. The second indication information is not specifically limited in the embodiments of the present disclosure, and for example, may be a character "P". The encoded result corresponding to the second word segmentation includes the word embedding corresponding to the second word segmentation and the second indication information. In an example, the word embedding corresponding to the second word segmentation and the second indication information may be spliced to acquire the encoded result corresponding to the second word segmentation.

Correspondingly, the third encoding manner may be the foregoing preset encoding manner, that is, an encoded result corresponding to the third word segmentation is a word embedding corresponding to the third word segmentation.

The embodiments of the present disclosure do not specifically limit the preset encoding manner, which may be related to a structure of the entity recognition model. For example, when the entity recognition model is a model trained based on bidirectional encoder representation from transformers (bert), the preset encoding manner may be an encoding manner in which a word embedding input into bert is used. In this case, the foregoing first indication information or the second indication information may be carried by using a reserved token in the word embedding. That is, the first indication information may be carried by using a token reserved in the word embedding corresponding to the first word segmentation, and the second indication information may be carried by using a token reserved in the word embedding corresponding to the second word segmentation.

As can be learned from the foregoing description of the entity included in the data table, the data table may include entities of different types, for example, includes the three types of entities "dimension", "indicator", and "dimension member value" described above.

In an example, in order that more entity information in the to-be-query data table can be carried in the encoded result, the first encoding manner is related to an entity type of an entity that is completely matched with the first word segmentation in the to-be-query data table. The first encoding manner corresponding to different word segmentations that are completely matched with entities of different types in the to-be-query data table is different. Specifically, it is assumed that the to-be-processed query statement includes a word segmentation 1 and a word segmentation 2, the word segmentation 1 is completely matched with an entity 1 in the to-be-query data table, the word segmentation 2 is completely matched with an entity 2 in the to-be-query data table, and an entity type of the entity 1 is different from an entity type of the entity 2, the first encoding manner corresponding to the word segmentation 1 is different from the first encoding manner corresponding to the word segmentation 2.

In an example, for the first word segmentation, in addition to the foregoing first indication information, the encoded result of the first word segmentation may further include third indication information used for indicating an entity type of the entity that is completely matched with the first word segmentation in the to-be-query data table. For example, if the entity type is a dimension, the third indication information corresponds to a character "D". For example, if the entity type is a dimension member value, the third indication information corresponds to a character "V". For example, if the entity type is an indicator, the third indication information corresponds to a character "M". For example, if the entity type is a table name, the third indication information corresponds to a character "T". In an example, both the third indication information and the first indication information may be carried by using reserved tokens in the word embedding corresponding to the first word segmentation.

For understanding, reference may be made to Table 3 below, which shows an encoding manner of the first word segmentation that is completely matched with the entity in the to-be-query data table.

TABLE 3

| Entity type of an entity that is completely matched with the first word segmentation | First encoding manner corresponding to the first word segmentation | First encoding manner example |
|---|---|---|
| Dimension | Encoding manner 1 | D-E + word embedding |
| Dimension member value | Encoding manner 2 | V-E + word embedding |
| Indicator | Encoding manner 3 | M-E + word embedding |
| Table name | Encoding manner 4 | T-E + word embedding |

For the characters "D", "V", "M", "T", and "E" in the first encoding example in Table 3, reference may be made to the foregoing descriptions, and details are not described herein again.

It should be noted that the first encoding example shown in Table 3 is merely used as an implementation of the present disclosure, and the encoding manner 1, the encoding manner 2, the encoding manner 3, and the encoding manner 4 shown in Table 3 are not specifically limited in the embodiments of the present disclosure. The four encoding manners, namely, the encoding manner 1, the encoding manner 2, the encoding manner 3, and the encoding manner 4, are different from each other.

Similarly, the second encoding manner is related to an entity type of an entity that is partially matched with the second word segmentation in the to-be-query data table. The second encoding manner corresponding to different word segmentations that are partially matched with entities of different types in the to-be-query data table is different. Specifically, it is assumed that the to-be-processed query statement includes a word segmentation 3 and a word segmentation 4, the word segmentation 3 is partially matched with an entity 3 in the to-be-query data table, the word segmentation 4 is partially matched with an entity 4 in the to-be-query data table, and an entity type of the entity 3 is different from an entity type of the entity 4, the second encoding manner corresponding to the word segmentation 3 is different from the second encoding manner corresponding to the word segmentation 4.

In an example, for the second word segmentation, in addition to the foregoing second indication information, an encoded result of the second word segmentation may further include fourth indication information used for indicating an entity type of the entity that is partially matched with the second word segmentation in the to-be-query data table. For example, if the entity type is a dimension, the fourth indication information corresponds to a character "D". For example, if the entity type is a dimension member value, the fourth indication information corresponds to a character "V". For example, if the entity type is an indicator, the fourth indication information corresponds to a character "M". For example, if the entity type is a table name, the fourth indication information corresponds to a character "T". In an example, the fourth indication information and the second indication information may be carried by using reserved tokens in the word embedding corresponding to the second word segmentation.

For understanding, reference may be made to Table 4 below, which shows an encoding manner of the second word segmentation that is partially matched with the entity in the to-be-query data table.

TABLE 4

| Entity type of an entity that is partially matched with the second word segmentation | Second encoding manner corresponding to the second word segmentation | Second encoding manner example |
|---|---|---|
| Dimension | Encoding manner 5 | D-P + word embedding |
| Dimension member value | Encoding manner 6 | V-P + word embedding |
| Indicator | Encoding manner 7 | M-P + word embedding |
| Table name | Encoding manner 8 | T-P + word embedding |

For the characters "D", "V", "M", "T", and "P" in the first encoding example in Table 4, reference may be made to the foregoing descriptions, and details are not described herein again.

It should be noted that the encoding manner 5, the encoding manner 6, the encoding manner 7, and the encoding manner 8 shown in Table 4 are not specifically limited in the embodiments of the present disclosure. The second encoding example shown in Table 4 is merely used as an implementation of the present disclosure, and the four encoding manners, namely, the encoding manner 5, the encoding manner 6, the encoding manner 7, and the encoding manner 8, are different from each other.

S103: Separately input the at least one encoded result into an entity recognition model, to acquire at least one entity prediction result. The at least one entity prediction result includes an entity prediction result respectively corresponding to each encoded result in the at least one encoded result, and the entity recognition model is configured to predict an entity included in input information according to the input information.

In this embodiment of the present disclosure, the encoded result may be processed by using the entity recognition model, to determine an entity included in the to-be-processed query statement and corresponding to the to-be-query data table. The entity recognition model can determine an entity included in input content according to the input content input into the model. Therefore, in this embodiment of the present disclosure, for each encoded result in the at least one encoded result, the encoded result may be input into the entity recognition model, so that the entity recognition model may process the encoded result and output an entity prediction result corresponding to the encoded result. It is not difficult to understand that for an encoded result, a prediction result corresponding to the encoded result may be used for indicating an entity included in the to-be-processed query statement and corresponding to the to-be-query data table.

After the at least one encoded result is respectively input into the entity recognition model, one entity prediction result may be acquired. Each encoded result corresponds to one entity prediction result. Since there is a one-to-one correspondence between the encoded result and the to-be-query data table, one to-be-query data table may correspond to one entity prediction result. A to-be-query data table corresponding to an entity prediction result is a to-be-query data table corresponding to an encoded result used by the entity recognition model to predict the entity prediction result. For example, an encoded result 1 is acquired by encoding the to-be-processed query statement by using entity information of a to-be-query data table 1, and after the encoded result 1 is input into the entity recognition model, an entity prediction result 1 is acquired. A to-be-query data table corresponding to the entity prediction result 1 is the to-be-query data table 1.

In this embodiment of the present disclosure, for an encoded result corresponding to any to-be-query data table, the encoded result carries the entity information of the to-be-query data table. Because of this, when recognizing the entity in the to-be-processed query statement based on the encoded result, the entity recognition model may refer to the entity information of the to-be-query data table, so that the entity prediction result output by the entity recognition model is more consistent with the entity information in the to-be-query data table. Correspondingly, the entity prediction result output by the entity recognition model is more accurate.

In this embodiment of the present disclosure, the entity recognition model may be acquired through pre-training. For a training manner of the entity recognition model, reference may be made to the description of FIG. 2 below, and details are not described herein again.

S104: Determine a target entity prediction result corresponding to the to-be-processed query statement according to the at least one entity prediction result. The target entity prediction result indicates the entity included in the to-be-processed query statement.

After the at least one entity prediction result is determined, a target entity prediction result may be determined from the at least one entity prediction result. The target entity prediction result is used as a final entity prediction result of the to-be-processed query statement. In other words, the target entity prediction result can indicate the entity included in the to-be-processed query statement.

As a specific example, in a specific implementation of S104, one entity prediction result with a highest accuracy may be selected from the at least one entity prediction result as the target entity prediction result. For any entity prediction result, the accuracy of the entity prediction result may be determined based on an entity matching degree between the entity prediction result and an entity in a to-be-query data table corresponding to the entity prediction result. Specifically, an entity included in the entity prediction result may be matched with the entity in the to-be-query data table corresponding to the entity prediction result, to acquire the entity matching degree. For example, for each entity included in the entity prediction result, the entity is respectively matched with the entity in the foregoing to-be-query data table, to acquire a corresponding matching result (complete matching, partial matching, or no matching). Then, the entity matching degree is acquired based on the matching result corresponding to each entity.

In a specific example, when "acquiring the entity matching degree based on the matching result corresponding to each entity" is specifically implemented, different matching results may correspond to different matching degree weights. An average value of matching degree weights corresponding to the foregoing entities may be used as the entity matching degree. The following is illustrated as an example.

A matching degree weight corresponding to the complete matching is 1.0, a matching degree weight corresponding to the partial matching is 0.5, and a matching degree weight corresponding to the no matching is 0. It is assumed that an entity prediction result 1 corresponds to a to-be-query data table 1, the entity prediction result 1 includes four entities, namely, an entity 5, an entity 6, an entity 7, and an entity 8, the entity 5 and the entity 6 are completely matched with an entity in the to-be-query data table 1, and therefore, matching degree weights corresponding to the entity 5 and the entity 6 are 1.0. The entity 7 is partially matched with the entity in the to-be-query data table 1, and therefore, a matching degree weight corresponding to the entity 7 is 0.5. The entity 8 is not matched with the entity in the to-be-query data table 1, and therefore, a matching degree weight corresponding to the entity 8 is 0. Therefore, an entity matching degree between the entity prediction result 1 and the to-be-query data table 1 may be obtained as follows: $(1+1+0.5+0)/4=0.625$.

Certainly, "acquiring the entity matching degree based on the matching result corresponding to each entity" may alternatively be implemented in another manner, which is not described in detail here.

As another example, in a specific implementation of S104, entity prediction results with an accuracy higher than a specific threshold may all be determined as the target entity prediction result. This is not specifically limited in the embodiments of the present disclosure.

Since the accuracy of the at least one entity prediction result is high, the target entity prediction result determined based on the at least one entity prediction result is also more accurate. As shown, with the solution, the entity in the to-be-processed query statement can be accurately recognized, and specifically, an entity included in the to-be-processed query statement and corresponding to the to-be-query data table can be accurately recognized.

An embodiment of the present disclosure provides a method of entity recognition for a data table. The method includes: obtaining a to-be-processed query statement described in a natural language. At least one entity may be included in the to-be-processed query statement, and the entity may be an entity in at least one to-be-query data table. In order to accurately recognize the entity included in the to-be-processed query statement, for each to-be-query data table in the at least one to-be-query data table, the to-be-processed query statement may be encoded according to entity information of the to-be-query data table, to acquire an encoded result respectively corresponding to each to-be-query data table. In other words, after the to-be-processed query statement is encoded by using the entity information of each to-be-query data table, at least one encoded result may be acquired. It is not difficult to understand that for an encoded result corresponding to any to-be-query data table, the encoded result carries the entity information of the to-be-query data table. After the at least one encoded result is obtained, the at least one encoded result may be respectively input into an entity recognition model. The entity recognition model is configured to predict an entity included in input information according to the input information. Therefore, after the at least one encoded result is input into the entity recognition model, the entity recognition model may output an entity prediction result corresponding to each encoded result. In other words, after the at least one encoded result is input into the entity recognition model, at least one entity prediction result may be acquired. Since the encoded result carries the entity information of the to-be-query data table, when recognizing the entity in the to-be-processed query statement, the entity recognition model may refer to the entity information of the to-be-query data table, so that the entity prediction result output by the entity recognition model is more consistent with the entity information in the to-be-query data table. Correspondingly, the entity prediction result output by the entity recognition model is more accurate. After the at least one entity prediction result is determined, a target entity prediction result corresponding to the to-be-processed query statement may be determined according to the at least one entity prediction result, and the target entity prediction result indicates the entity included in the to-be-processed query statement. Since the accuracy of the at least one entity prediction result is high, the target entity prediction result determined based on the at least one entity prediction result is also more accurate. As shown, with the solution, the entity in the to-be-processed query statement can be accurately recognized.

Figure 2:
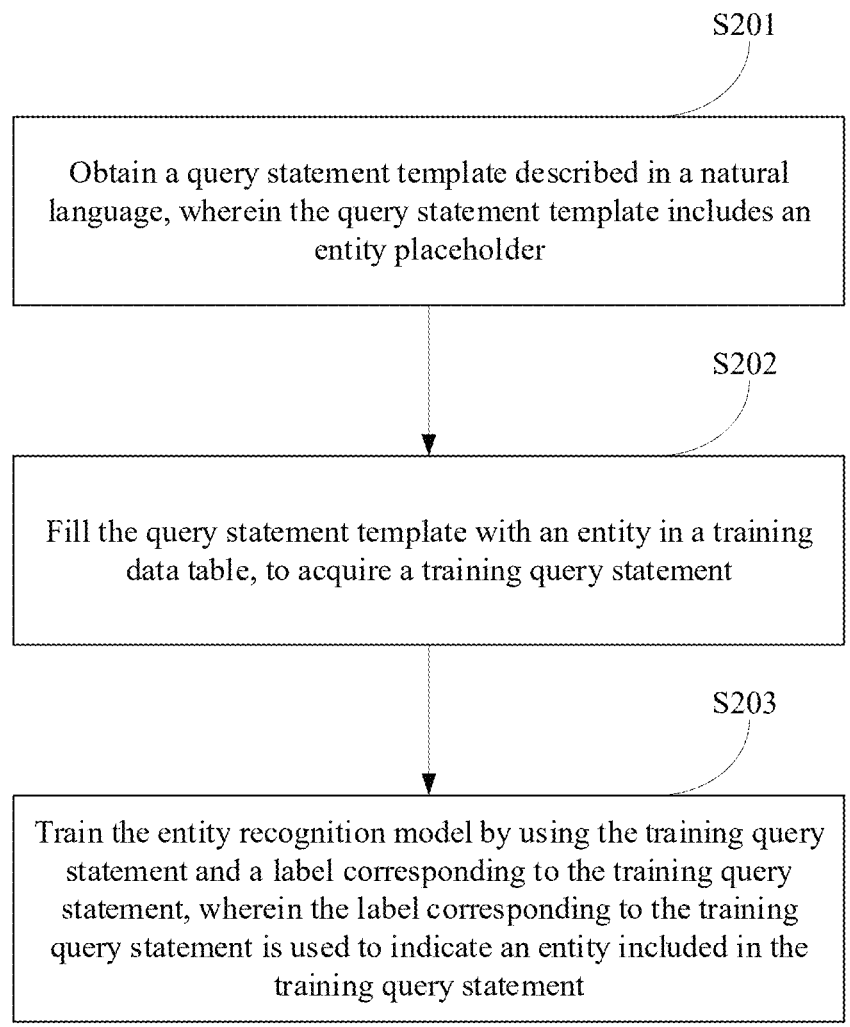
FIG. 2 is a schematic flowchart of a training method for an entity recognition model according to an embodiment of the present disclosure.

Next, with reference to FIG. 2, a training process of the entity recognition model is described. FIG. 2 is a schematic flowchart of a training method for an entity recognition model according to an embodiment of the present disclosure. The method shown in FIG. 2 may include the following S201 to S203.

S201: Obtain a query statement template described in a natural language. The query statement template includes an entity placeholder.

In this embodiment of the present disclosure, the query statement template is acquired by summarizing query statements. In an example, the query statement template may be: (view|query|find) [dimension member value 1] (and|or|,|) [dimension member value 2][time](of) [indicator name] (is how much|data), where:

Content in parentheses corresponds to a non-entity part. For a non-entity in a parenthesis, there may be a plurality of cases. For example, the foregoing first parenthesis includes three cases: "view", "query", and "find". The plurality of cases may be separated by a symbol "|".

Content in square brackets corresponds to an entity part, that is, the content in the square brackets corresponds to the entity placeholder.

S202: Fill the query statement template with an entity in a training data table, to acquire a training query statement.

After the query statement template is acquired, a training query statement may be acquired based on the query statement template. Specifically, for a non-entity part in the query statement template, if the non-entity part includes a plurality of cases, one case may be selected from the plurality of cases as a word segmentation in the training query statement; and for an entity part in the query statement template, the entity part may be filled with the entity in the training data table. After the entity content and the non-entity content in the query statement template are determined, the training query statement may be acquired.

In an example, when the entity part in the query statement is filled with the entity in the training data table in a specific implementation, a corresponding entity part in the query statement template may be filled with an entity that is completely matched with the entity in the training data table. For example, an entity part in the query statement template is filled with an entity in the data table described in Table 1, to acquire a training query statement: View [region B] [in the last seven days] [sales] data. Entities [region B] and [sales] in the training query statement are both entities that are completely matched with the entity in the training data table. For example, an entity part in the query statement template is filled with an entity in the data table described in Table 2, to acquire a training query statement: View [region B] [sales in the last seven days] data. Entities [region B] and [sales in the last seven days] in the training query statement are both entities that are completely matched with the entity in the training data table.

In an example, in consideration of different language habits of different users, for example, for "region B", some users are accustomed to describe it as "B", and some users are accustomed to describe it as "region B". Therefore, in order that the training query statement can cover language habits of more users as much as possible, when the entity part in the query statement is filled with the entity in the training data table in a specific implementation, a corresponding entity part in the query statement template may be filled with an entity that is partially matched with the entity in the training data table. For example, an entity part in the query statement template is filled with an entity in the data table described in Table 1, to acquire a training query statement: View [B] [in the last three days] [profit margin] is how much. Entities [B] and [profit margin] in the training query statement are entities that are partially matched with the entity in the training data table. For example, an entity part in the query statement template is filled with an entity in the data table described in Table 2, to acquire a training query statement: View [B] [profit margin in the last three days] is how much. Entities [B] and [profit margin in the last three days] in the training query statement are entities that are partially matched with the entity in the training data table.

In an example, when the entity part in the query statement is filled with the entity in the training data table in a specific implementation, a corresponding partial entity part in the query statement template may be filled with an entity that is completely matched with the entity in the training data table, and a corresponding other entity part in the query statement template may be filled with an entity that is partially matched with the entity in the training data table. For example, an entity part in the query statement template is filled with an entity in the data table described in Table 1, to acquire a training query statement: View [region B] [in the last three days] [profit margin] is how much. An entity [region B] in the training query statement is an entity that is completely matched with the entity in the training data table, and an entity [profit margin] in the training query statement is an entity that is partially matched with the entity in the training data table. For example, an entity part in the query statement template is filled with an entity in the data table described in Table 2, to acquire a training query statement: View [region B] [profit margin in the last three days] is how much. An entity [region B] in the training query statement is an entity that is completely matched with the entity in the training data table, and an entity [profit margin in the last three days] in the training query statement is an entity that is partially matched with the entity in the training data table.

S203: Train the entity recognition model by using the training query statement and a label corresponding to the training query statement. The label corresponding to the training query statement is used to indicate an entity included in the training query statement.

In this embodiment of the present disclosure, after the training query statement is acquired, the entity recognition model may be trained by using the training query statement and the label corresponding to the training query statement. The label corresponding to the training query statement may include labels corresponding to all characters in the training query statement. For example, for a character in a non-entity, a label of the character is O; for a first character in an entity, a label of the first character is B; and for a middle character in the entity, a label of the middle character is I.

In this embodiment of the present disclosure, when the entity recognition model is trained in a specific implementation, for example, the entity recognition model may be trained based on the training query statement and the label corresponding to the training query statement on the basis of a pre-trained model, to improve efficiency of training to obtain the entity recognition model. The pre-trained model is not specifically limited in the embodiments of the present disclosure and may be any transformer encoder model. In an example, the pre-trained model may be a bert model.

In this embodiment of the present disclosure, when the entity recognition model is trained by using the training query statement and the label corresponding to the training query statement in a specific implementation, the training query statement may be encoded to acquire an encoded result, and then the entity recognition model is trained based on the encoded result and the label. Specifically, in a process of model training, the encoded result may be processed by using the entity recognition model, to predict an entity in the training query statement (that is, processing is performed to acquire a label prediction result), and then a parameter of the entity recognition model is adjusted based on the label prediction result and the foregoing label. In this embodiment of the present disclosure, an encoding manner of encoding the training query statement is similar to an encoding manner of encoding the to-be-processed query statement. Specifically, a first entity that is completely matched with the entity in the training data table in the training query statement is encoded by using a first encoding manner; and/or a second entity that is partially matched with the entity in the training data table in the training query statement is encoded by using a second encoding manner. In other words, for the first entity in the training query statement, if the entity is directly filled with a specific entity in the training data table, the first entity is encoded by using the first encoding manner. For the second entity in the training query statement, if the entity is filled with an entity that is partially matched with a specific entity in the training data table, the second entity is encoded by using the second encoding manner.

Moreover, when the training query statement is encoded, the first encoding manner is also related to an entity type of an entity that is completely matched with the first entity in the training data table. Different entities that are completely matched with entities of different types in the training data table correspond to different first encoding manners. For understanding, reference may be made to Table 3 above:

If an entity type of the entity that is completely matched with the first entity in the training data table is a dimension (that is, an entity type corresponding to the first entity is a dimension), the first encoding manner of encoding the first entity is the encoding manner 1; if the entity type of the entity that is completely matched with the first entity in the training data table is a dimension member value (that is, the entity type corresponding to the first entity is a dimension member value), the first encoding manner of encoding the first entity is the encoding manner 2; if the entity type of the entity that is completely matched with the first entity in the training data table is an indicator (that is, the entity type corresponding to the first entity is an indicator), the first encoding manner of encoding the first entity is the encoding manner 3; and if the entity type of the entity that is completely matched with the first entity in the training data table is a table name (that is, the entity type corresponding to the first entity is a table name), the first encoding manner of encoding the first entity is the encoding manner 4.

In addition, the second encoding manner is related to an entity type of an entity that is partially matched with the second entity in the training data table. Different entities that are partially matched with entities of different types in the training data table correspond to different second encoding manners. For understanding, reference may be made to Table 4 above:

If the entity type of the entity that is partially matched with the second entity in the training data table is a dimension, the second encoding manner of encoding the second entity is the encoding manner 5; if the entity type of the entity that is partially matched with the second entity in the training data table is a dimension member value, the second encoding manner of encoding the second entity is the encoding manner 6; if the entity type of the entity that is partially matched with the second entity in the training data table is an indicator, the second encoding manner of encoding the second entity is the encoding manner 7; and if the entity type of the entity that is partially matched with the second entity in the training data table is a table name, the second encoding manner of encoding the second entity is the encoding manner 8.

For the first encoding manner used for encoding the training query statement, reference may be made to the description of the first encoding manner used for encoding the to-be-processed query statement above. For the second encoding manner used for encoding the training query statement, reference may be made to the description of the second encoding manner used for encoding the to-be-processed query statement above. Details are not described herein again.

The method of entity recognition for the data table provided in this embodiment of the present disclosure is described above. Next, the solution provided in this embodiment of the present disclosure is described with reference to a specific scenario.

Figure 3:
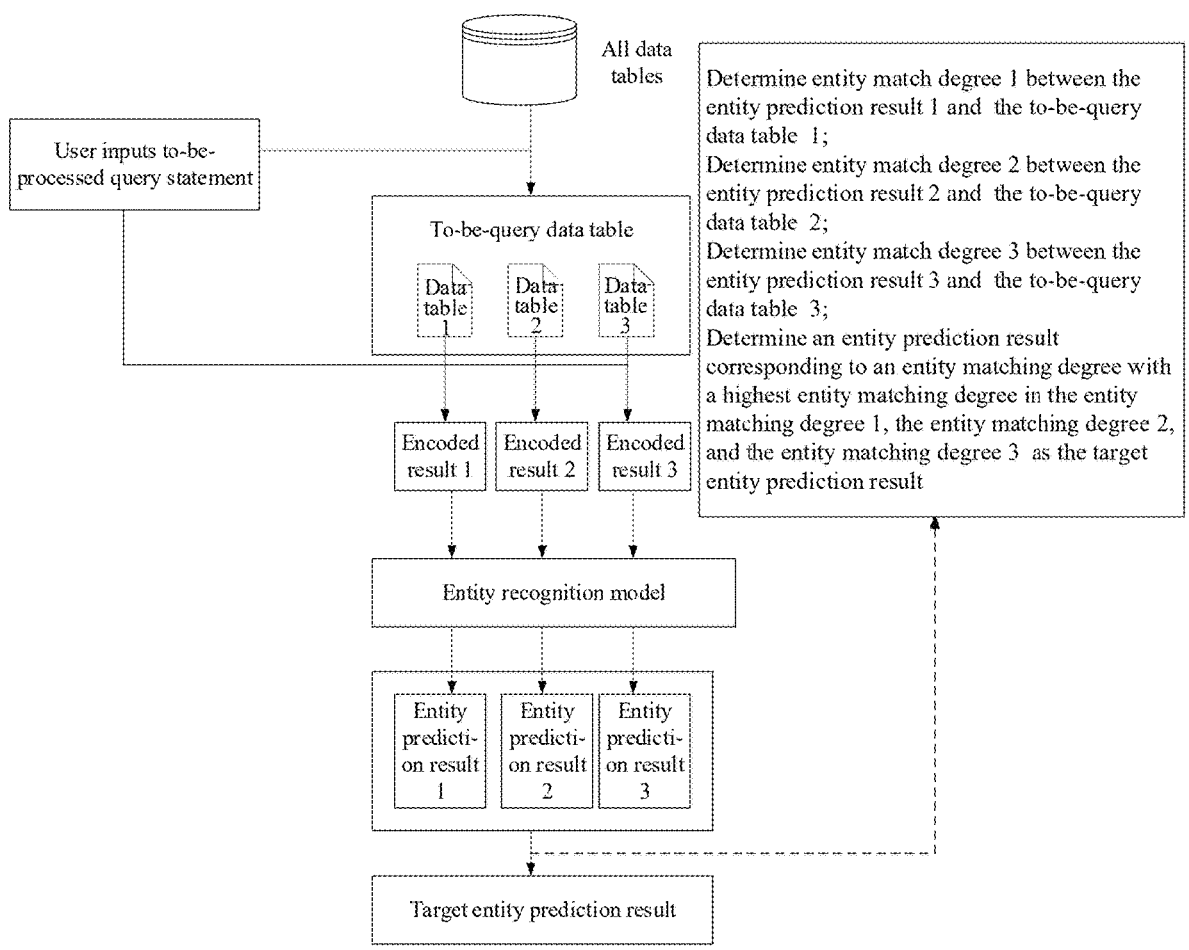
FIG. 3 is a schematic diagram of an example disclosure scenario according to an embodiment of the present disclosure.

Referring to FIG. 3, FIG. 3 is a schematic diagram of an example disclosure scenario according to an embodiment of the present disclosure.

As shown in FIG. 3, after inputting the to-be-processed query statement, the user may match the to-be-processed query statement with all data tables (corresponding to the plurality of candidate data tables mentioned above), to screen out the at least one to-be-query data table. FIG. 3 uses an example in which three to-be-query data tables, namely, a to-be-query data table 1, a to-be-query data table 2, and a to-be-query data table 3, are screened out for description.

Then, for the three to-be-query data tables, the to-be-processed query statement is encoded respectively based on entity information of each to-be-query data table, to acquire encoded results corresponding to the to-be-query data tables. As shown in FIG. 3, an encoded result 1 corresponding to the to-be-query data table 1, an encoded result 2 corresponding to the to-be-query data table 2, and an encoded result 3 corresponding to the to-be-query data table 3 may be acquired.

The encoded result 1, the encoded result 2, and the encoded result 3 are respectively input into the entity recognition model, and the entity recognition model outputs an entity prediction result 1 corresponding to the encoded result 1, an entity prediction result 2 corresponding to the encoded result 2, and an entity prediction result 3 corresponding to the encoded result 3.

The entity prediction result 1 is compared with the to-be-query data table 1, to determine an entity matching degree 1 between the entity prediction result 1 and the to-be-query data table 1. Similarly, the entity prediction result 2 is compared with the to-be-query data table 2, to determine an entity matching degree 2 between the entity prediction result 2 and the to-be-query data table 2; and the entity prediction result 3 is compared with the to-be-query data table 3, to determine an entity matching degree 3 between the entity prediction result 3 and the to-be-query data table 3.

An entity prediction result corresponding to an entity matching degree with a highest entity matching degree in the entity matching degree 1, the entity matching degree 2, and the entity matching degree 3 is determined as the target entity prediction result. For example, if the entity matching degree 1 is greater than the entity matching degree 2 and the entity matching degree 3, the entity prediction result 1 may be used as the target entity prediction result.

Based on the method provided in the foregoing embodiment, the embodiment of the present disclosure further provides an apparatus. The apparatus is described below with reference to the accompanying drawings.

Figure 4:
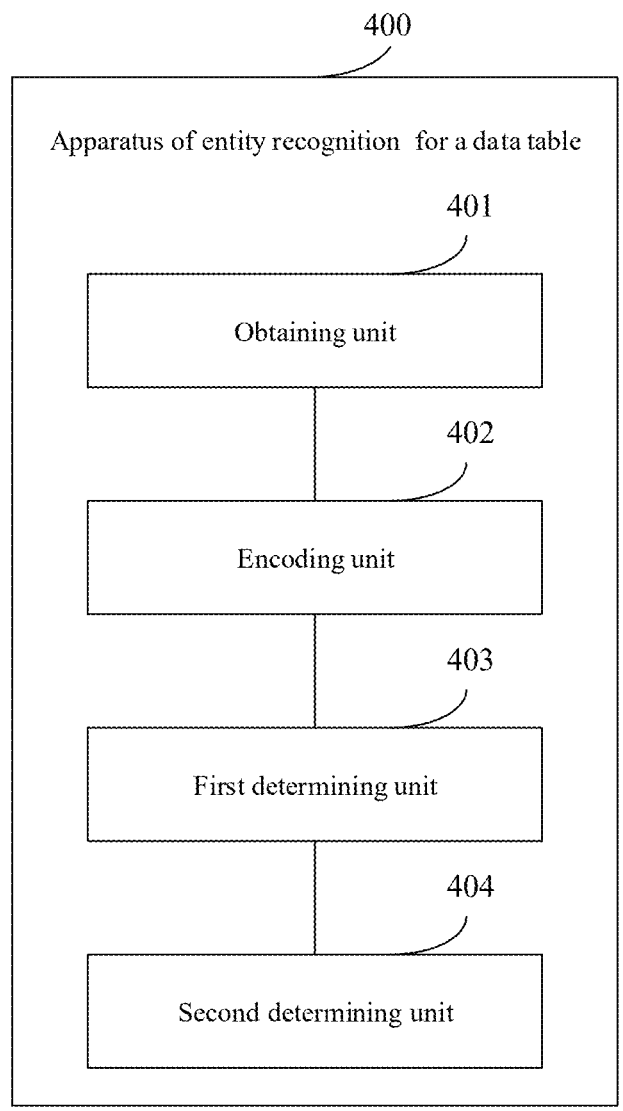
FIG. 4 is a schematic diagram of a structure of an apparatus of entity recognition for a data table according to an embodiment of the present disclosure.

Referring to FIG. 4, FIG. 4 is a schematic diagram of a structure of an apparatus of entity recognition for a data table according to an embodiment of the present disclosure. An apparatus 400 shown in FIG. 4 includes: an obtaining unit 401, an encoding unit 402, a first determining unit 403, and a second determining unit 404.

The obtaining unit 401 is configured to obtain a to-be-processed query statement described in a natural language.

The encoding unit 402 is configured to, for each of at least one to-be-query data table, encode the to-be-processed query statement according to entity information of the to-be-query data table, to acquire at least one encoded result, wherein the at least one encoded result includes encoded results respectively corresponding to the to-be-query data tables.

The first determining unit 403 is configured to respectively input the at least one encoded result into an entity recognition model, to acquire at least one entity prediction result, wherein the at least one entity prediction result includes an entity prediction result respectively corresponding to each encoded result in the at least one encoded result, and the entity recognition model is configured to predict an entity included in input information according to the input information.

The second determining unit 404 is configured to determine a target entity prediction result corresponding to the to-be-processed query statement according to the at least one entity prediction result, wherein the target entity prediction result indicates the entity included in the to-be-processed query statement.

Optionally, the encoding unit 402 is configured to:
encode a first word segmentation that is completely matched with an entity in the to-be-query data table in the to-be-processed query statement by using a first encoding manner; and/or
encode a second word segmentation that is partially matched with the entity in the to-be-query data table in the to-be-processed query statement by using a second encoding manner, wherein the second encoding manner is different from the first encoding manner.

Optionally, encoding the first word segmentation by using the first encoding manner includes:
encoding the first word segmentation by using a preset encoding manner, to acquire a word embedding corresponding to the first word segmentation; and acquiring an encoded result corresponding to the first word segmentation according to the word embedding corresponding to the first word segmentation and first indication information, wherein the first indication information indicates the first word segmentation being a word segmentation that is completely matched with the entity in the to-be-query data table, and the encoded result corresponding to the first word segmentation includes the word embedding corresponding to the first word segmentation and the first indication information; and the encoding the second word segmentation by using the second encoding manner includes:

encoding the second word segmentation by using the preset encoding manner, to acquire a word embedding corresponding to the second word segmentation; and acquiring an encoded result corresponding to the second word segmentation according to the word embedding corresponding to the second word segmentation and second indication information, wherein the second indication information indicates the second word segmentation being a word segmentation that is partially matched with the entity in the to-be-query data table, and the encoded result corresponding to the second word segmentation includes the word embedding corresponding to the second word segmentation and the second indication information.

Optionally, the first encoding manner is related to an entity type of an entity that is completely matched with the first word segmentation in the to-be-query data table, and different word segmentations that are completely matched with entities of different types in the to-be-query data table correspond to different first encoding manners; and the second encoding manner is related to an entity type of an entity that is partially matched with the second word segmentation in the to-be-query data table, and different word segmentations that are partially matched with entities of different types in the to-be-query data table correspond to different second encoding manners.

Optionally, the apparatus further includes:

a matching unit, configured to match the to-be-processed query statement with a plurality of candidate data tables; and a third determining unit, configured to determine the at least one to-be-query data table from candidate data tables that are successfully matched with the to-be-processed query statement.

Optionally, the second determining unit 404 is configured to:

for each entity prediction result in the at least one entity prediction result, determine an entity matching degree between the entity prediction result and an entity in a to-be-query data table corresponding to the entity prediction result, wherein the to-be-query data table corresponding to the entity prediction result is a to-be-query data table corresponding to an encoded result used by the entity recognition model to predict the entity prediction result; and determine, from the at least one entity prediction result, an entity prediction result corresponding to the highest entity matching degree as the target entity prediction result.

Optionally, the entity recognition model is acquired through training by using the following manner:

obtaining a query statement template described in a natural language, wherein the query statement template includes an entity placeholder;

filling the query statement template with an entity in a training data table, to acquire a training query statement; and training the entity recognition model by using the training query statement and a label corresponding to the training query statement, wherein the label corresponding to the training query statement is used to indicate an entity included in the training query statement.

Optionally, the filling the query statement template with an entity in a training data table includes:

filling the query statement template with an entity that is completely matched with the entity in the training data table; or filling the query statement template with an entity that is partially matched with the entity in the training data table.

Optionally, the training the entity recognition model by using the training query statement and the label corresponding to the training query statement includes:

encoding the training query statement to acquire an encoded result; and training the entity recognition model based on the label and the encoded result acquired by encoding the training query statement, wherein:

a first entity that is completely matched with the entity in the training data table in the training query statement is encoded by using a first encoding manner; and/or a second entity that is partially matched with the entity in the training data table in the training query statement is encoded by using a second encoding manner.

Optionally, the first encoding manner is related to an entity type of an entity that is completely matched with the first entity in the training data table, and different entities that are completely matched with entities of different types in the training data table correspond to different first encoding manners; and the second encoding manner is related to an entity type of an entity that is partially matched with the second entity in the training data table, and different entities that are partially matched with entities of different types in the training data table correspond to different second encoding manners.

Because the apparatus 400 is an apparatus corresponding to the method of entity recognition for the data table provided in the foregoing method embodiments, specific implementations of the units of the apparatus 400 are all the same concept as that of the foregoing method embodiments. Therefore, for specific implementations of the units of the apparatus 400, reference may be made to the related description of the foregoing method embodiments, and details are not described herein again.

The embodiments of the present disclosure further provide an electronic device. The electronic device includes a processor and a memory.

The processor is configured to execute instructions stored in the memory, to enable the device to perform the method of entity recognition for the data table provided in the foregoing method embodiments.

The embodiments of the present disclosure provide a non-transient computer-readable storage medium, including instructions, wherein the instructions instruct a device to perform the method of entity recognition for the data table provided in the foregoing method embodiments.

The embodiments of the present disclosure further provide a computer program product that, when running on a computer, causes the computer to perform the method of entity recognition for the data table provided in the foregoing method embodiments.

Persons skilled in the art may easily think of other implementation solutions of the present disclosure after considering the specification and practicing the invention disclosed herein. The present disclosure is intended to cover any variations, uses, or adaptive changes of the present disclosure. These variations, uses, or adaptive changes follow the general principles of the present disclosure and include common knowledge or conventional technical means in the art that are not disclosed in the present disclosure. The specification and embodiments are only considered as examples, and the true scope and spirit of the present disclosure are defined by the following claims.

It should be understood that the present disclosure is not limited to the precise structures that have been described above and shown in the accompanying drawings, and various modifications and changes may be made without departing from the scope thereof. The scope of the present disclosure is limited only by the appended claims.

The foregoing descriptions are merely preferred embodiments of the present disclosure and are not intended to limit the present disclosure. Any modifications, equivalent replacements, and improvements made within the spirit and principle of the present disclosure shall fall within the protection scope of the present disclosure.

The invention claimed is:

1. A method of entity recognition for a data table, comprising:
    obtaining a to-be-processed query statement described in a natural language;
    encoding the to-be-processed query statement according to entity information of a to-be-query data table for each to-be-query data table in at least one to-be-query data table, to acquire at least one encoded result, wherein the at least one encoded result comprises an encoded result respectively corresponding to each to-be-query data table;
    after encoding the to-be-processed query statement according to entity information of the to-be-query data table for each to-be-query data table in at least one to-be-query data table, to acquire at least one encoded result, respectively inputting the at least one encoded result into an entity recognition model, to acquire at least one entity prediction result, wherein the at least one entity prediction result comprises an entity prediction result respectively corresponding to each encoded result in the at least one encoded result, and the entity recognition model is configured to predict an entity included in input information according to the input information; and
    determining a target entity prediction result corresponding to the to-be-processed query statement according to the at least one entity prediction result, wherein the target entity prediction result indicates the entity included in the to-be-processed query statement, and the target entity prediction result corresponds to a queried data table,
    the encoding the to-be-processed query statement according to the entity information of the to-be-query data table comprises:
    encoding a first word segmentation that is completely matched with an entity in the to-be-query data table in the to-be-processed query statement by using a first encoding manner; and/or
    encoding a second word segmentation that is partially matched with the entity in the to-be-query data table in the to-be-processed query statement by using a second encoding manner, wherein the second encoding manner is different from the first encoding manner.

2. The method according to claim 1, wherein, the encoding the first word segmentation by using the first encoding manner comprises:
    encoding the first word segmentation by using a preset encoding manner, to acquire a word embedding corresponding to the first word segmentation; and acquiring an encoded result corresponding to the first word segmentation according to first indication information and the word embedding corresponding to the first word segmentation, wherein the first indication information indicates the first word segmentation being a word segmentation that is completely matched with the entity in the to-be-query data table, and the encoded result corresponding to the first word segmentation comprises the first indication information and the word embedding corresponding to the first word segmentation,
    the encoding the second word segmentation by using the second encoding manner comprises:
    encoding the second word segmentation by using the preset encoding manner, to acquire a word embedding corresponding to the second word segmentation; and acquiring an encoded result corresponding to the second word segmentation according to second indication information and the word embedding corresponding to the second word segmentation, wherein the second indication information indicates the second word segmentation being a word segmentation that is partially matched with the entity in the to-be-query data table, and the encoded result corresponding to the second word segmentation comprises the second indication information and the word embedding corresponding to the second word segmentation.

3. The method according to claim 2, wherein,
    the first encoding manner is related to an entity type of an entity that is completely matched with the first word segmentation in the to-be-query data table, and the first encoding manner corresponding to different word segmentations that are completely matched with entities of different types in the to-be-query data table is different; and
    the second encoding manner is related to an entity type of an entity that is partially matched with the second word segmentation in the to-be-query data table, and the second encoding manner corresponding to different word segmentations that are partially matched with entities of different types in the to-be-query data table is different.

4. The method according to claim 1, wherein,
    the first encoding manner is related to an entity type of an entity that is completely matched with the first word segmentation in the to-be-query data table, and the first encoding manner corresponding to different word segmentations that are completely matched with entities of different types in the to-be-query data table is different, and
    the second encoding manner is related to an entity type of an entity that is partially matched with the second word segmentation in the to-be-query data table, and the second encoding manner corresponding to different word segmentations that are partially matched with entities of different types in the to-be-query data table is different.

5. The method according to claim 1, further comprising:
    matching the to-be-processed query statement with a plurality of candidate data tables; and
    determining the at least one to-be-query data table from candidate data tables that are successfully matched with the to-be-processed query statement.

6. The method according to claim 1, wherein, the determining the target entity prediction result corresponding to the to-be-processed query statement according to the at least one entity prediction result comprises:
  determining, for each entity prediction result in the at least one entity prediction result, an entity matching degree between the entity prediction result and an entity in a to-be-query data table corresponding to the entity prediction result, wherein the to-be-query data table corresponding to the entity prediction result is a to-be-query data table corresponding to an encoded result used by the entity recognition model to predict the entity prediction result; and
  determining, from the at least one entity prediction result, an entity prediction result corresponding to a highest entity matching degree as the target entity prediction result.

7. The method according to claim 1, wherein, the entity recognition model is acquired through training in the following manner:
  obtaining a query statement template described in a natural language, wherein the query statement template comprises an entity placeholder;
  filling the query statement template with an entity in a training data table, to acquire a training query statement; and
  training the entity recognition model by using the training query statement and a label corresponding to the training query statement, wherein the label corresponding to the training query statement is used for indicating the entity included in the training query statement.

8. The method according to claim 7, wherein, the filling the query statement template with the entity in the training data table comprises:
  filling the query statement template with an entity that is completely matched with the entity in the training data table; and/or
  filling the query statement template with an entity that is partially matched with the entity in the training data table.

9. The method according to claim 8, wherein, the training the entity recognition model by using the training query statement and the label corresponding to the training query statement comprises:
  encoding the training query statement, to acquire an encoded result; and
  training the entity recognition model based on the label and the encoded result acquired by encoding the training query statement, wherein:
  a first entity that is completely matched with an entity in the training data table in the training query statement is encoded by using a first encoding manner; and/or a second entity that is partially matched with the entity in the training data table in the training query statement is encoded by using a second encoding manner.

10. The method according to claim 9, wherein,
  the first encoding manner is related to an entity type of an entity that is completely matched with the first entity in the training data table, and the first encoding manner corresponding to different entities that are completely matched with entities of different types in the training data table is different; and
  the second encoding manner is related to an entity type of an entity that is partially matched with the second entity in the training data table, and the second encoding manner corresponding to different entities that are partially matched with entities of different types in the training data table is different.

11. An electronic device, comprising a processor and a memory,
  wherein the processor is configured to execute instructions stored in the memory, so that the electronic device executes a method of entity recognition for a data table, and the method comprises:
  obtaining a to-be-processed query statement described in a natural language;
  encoding the to-be-processed query statement according to entity information of a to-be-query data table for each to-be-query data table in at least one to-be-query data table, to acquire at least one encoded result, wherein the at least one encoded result comprises an encoded result respectively corresponding to each to-be-query data table;
  after encoding the to-be-processed query statement according to entity information of the to-be-query data table for each to-be-query data table in at least one to-be-query data table, to acquire at least one encoded result, respectively inputting the at least one encoded result into an entity recognition model, to acquire at least one entity prediction result, wherein the at least one entity prediction result comprises an entity prediction result respectively corresponding to each encoded result in the at least one encoded result, and the entity recognition model is configured to predict an entity included in input information according to the input information; and
  determining a target entity prediction result corresponding to the to-be-processed query statement according to the at least one entity prediction result, wherein the target entity prediction result indicates the entity included in the to-be-processed query statement, and the target entity prediction result corresponds to a queried data table,
  the encoding the to-be-processed query statement according to the entity information of the to-be-query data table comprises:
  encoding a first word segmentation that is completely matched with an entity in the to-be-query data table in the to-be-processed query statement by using a first encoding manner; and/or
  encoding a second word segmentation that is partially matched with the entity in the to-be-query data table in the to-be-processed query statement by using a second encoding manner, wherein the second encoding manner is different from the first encoding manner.

12. The electronic device according to claim 11, wherein, the encoding the first word segmentation by using the first encoding manner comprises:
  encoding the first word segmentation by using a preset encoding manner, to acquire a word embedding corresponding to the first word segmentation; and acquiring an encoded result corresponding to the first word segmentation according to first indication information and the word embedding corresponding to the first word segmentation, wherein the first indication information indicates the first word segmentation being a word segmentation that is completely matched with the entity in the to-be-query data table, and the encoded result corresponding to the first word segmentation comprises the first indication information and the word embedding corresponding to the first word segmentation;

the encoding the second word segmentation by using the second encoding manner comprises:

encoding the second word segmentation by using the preset encoding manner, to acquire a word embedding corresponding to the second word segmentation; and acquiring an encoded result corresponding to the second word segmentation according to second indication information and the word embedding corresponding to the second word segmentation, wherein the second indication information indicates the second word segmentation being a word segmentation that is partially matched with the entity in the to-be-query data table, and the encoded result corresponding to the second word segmentation comprises the second indication information and the word embedding corresponding to the second word segmentation.

13. The electronic device according to claim 11, wherein, the first encoding manner is related to an entity type of an entity that is completely matched with the first word segmentation in the to-be-query data table, and the first encoding manner corresponding to different word segmentations that are completely matched with entities of different types in the to-be-query data table is different; and the second encoding manner is related to an entity type of an entity that is partially matched with the second word segmentation in the to-be-query data table, and the second encoding manner corresponding to different word segmentations that are partially matched with entities of different types in the to-be-query data table is different.

14. The electronic device according to claim 11, wherein, the method further comprises:

matching the to-be-processed query statement with a plurality of candidate data tables; and determining the at least one to-be-query data table from candidate data tables that are successfully matched with the to-be-processed query statement.

15. The electronic device according to claim 11, wherein, the determining the target entity prediction result corresponding to the to-be-processed query statement according to the at least one entity prediction result comprises:

determining, for each entity prediction result in the at least one entity prediction result, an entity matching degree between the entity prediction result and an entity in a to-be-query data table corresponding to the entity prediction result, wherein the to-be-query data table corresponding to the entity prediction result is a to-be-query data table corresponding to an encoded result used by the entity recognition model to predict the entity prediction result; and determining, from the at least one entity prediction result, an entity prediction result corresponding to a highest entity matching degree as the target entity prediction result.

16. The electronic device according to claim 11, wherein, the entity recognition model is acquired through training in the following manner:

obtaining a query statement template described in a natural language, wherein the query statement template comprises an entity placeholder;

filling the query statement template with an entity in a training data table, to acquire a training query statement; and training the entity recognition model by using the training query statement and a label corresponding to the training query statement, wherein the label corresponding to the training query statement is used for indicating the entity included in the training query statement.

17. The electronic device according to claim 16, wherein, the filling the query statement template with the entity in the training data table comprises:

filling the query statement template with an entity that is completely matched with the entity in the training data table; and/or filling the query statement template with an entity that is partially matched with the entity in the training data table.

18. A non-transient computer-readable storage medium, wherein the computer-readable storage medium comprises instructions, and the instructions instruct a device to execute a method of entity recognition for a data table, and the method comprises:

obtaining a to-be-processed query statement described in a natural language;

encoding the to-be-processed query statement according to entity information of a to-be-query data table for each to-be-query data table in at least one to-be-query data table, to acquire at least one encoded result, wherein the at least one encoded result comprises an encoded result respectively corresponding to each to-be-query data table;

after encoding the to-be-processed query statement according to entity information of the to-be-query data table for each to-be-query data table in at least one to-be-query data table, to acquire at least one encoded result, respectively inputting the at least one encoded result into an entity recognition model, to acquire at least one entity prediction result, wherein the at least one entity prediction result comprises an entity prediction result respectively corresponding to each encoded result in the at least one encoded result, and the entity recognition model is configured to predict an entity included in input information according to the input information; and determining a target entity prediction result corresponding to the to-be-processed query statement according to the at least one entity prediction result, wherein the target entity prediction result indicates the entity included in the to-be-processed query statement, and the target entity prediction result corresponds to a queried data table, the encoding the to-be-processed query statement according to the entity information of the to-be-query data table comprises:

encoding a first word segmentation that is completely matched with an entity in the to-be-query data table in the to-be-processed query statement by using a first encoding manner; and/or encoding a second word segmentation that is partially matched with the entity in the to-be-query data table in the to-be-processed query statement by using a second encoding manner, wherein the second encoding manner is different from the first encoding manner.

* * * * *